Figure 1:
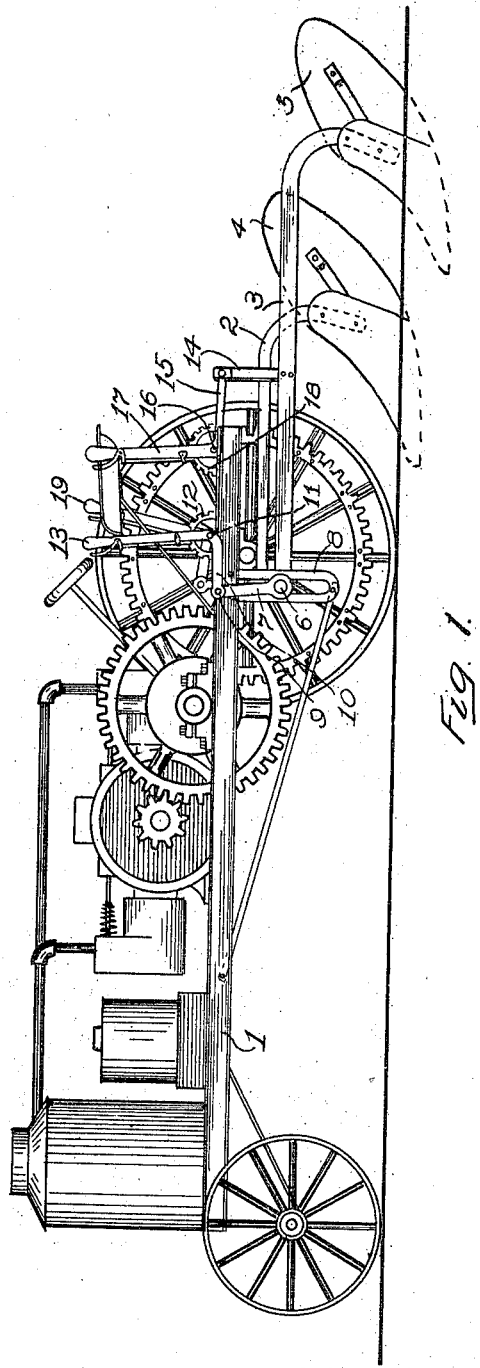

H. W. LEAVITT.
ADJUSTABLE TOOL HITCH FOR TRACTORS.
APPLICATION FILED APR. 21, 1913.

1,078,736.

Patented Nov. 18, 1913.
2 SHEETS—SHEET 1.

WITNESSES.
H. B. Burr
C. Lindner

INVENTOR
H. W. LEAVITT
by G. C. Kennedy
ATTORNEY

H. W. LEAVITT.
ADJUSTABLE TOOL HITCH FOR TRACTORS.
APPLICATION FILED APR. 21, 1913.
1,078,736.
Patented Nov. 18, 1913
2 SHEETS—SHEET 2.
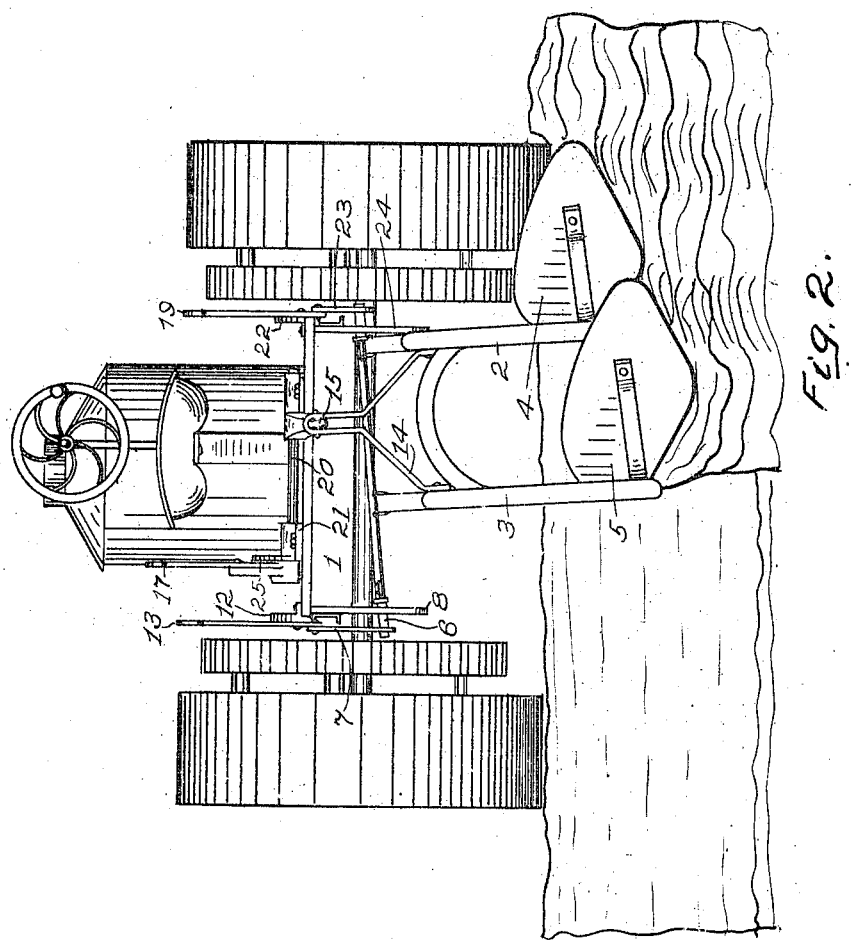
WITNESSES:
INVENTOR
H. W. LEAVITT
by G. C. Kennedy
ATTORNEY

UNITED STATES PATENT OFFICE.

HARRY W. LEAVITT, OF PARIS, MISSOURI.

ADJUSTABLE TOOL-HITCH FOR TRACTORS.

1,078,736.  Specification of Letters Patent. Patented Nov. 18, 1913.

Application filed April 21, 1913. Serial No. 762,613.

*To all whom it may concern:*

Be it known that I, HARRY W. LEAVITT, a citizen of the United States of America, and a resident of Paris, Monroe county, Missouri, have invented certain new and useful Improvements in Adjustable Tool-Hitches for Tractors, of which the following is a specification.

My invention relates to improvements in adjustable tool-hitches for tractors, and the object of my improvement is to supply means for independently adjustably tilting connected tools or implements drawn by a tractor, so that either tool may be tilted independently of the other, transversely of the tractor, and in an opposite direction to the direction of tilting or rocking of the other tool. This object I have accomplished by the means which are hereinafter described and claimed, and which are illustrated in the accompanying drawings, in which:

Figure 1 is a left-hand side elevation of a tractor with a pair of rigidly-connected plows drawn thereby, and having intermediate operative connections adapted for use in differentially tilting said plows, transversely. Fig. 2 is a rear elevation of the mechanisms shown in said Fig. 1.

Similar numerals of reference denote corresponding parts throughout the several views.

I have shown a tractor having a horizontal frame 1 mounted on carrying and traction-wheels. Operatively connected to said tractor-frame is shown a pair of transversely-spaced plows 4 and 5, whose main-beams 2 and 3 respectively are rigidly connected by a tiltable cross-bar 6, as also by means of an arched-bar 14. A transverse rock-bar 20 is mounted in bearings 21 on said frame 1, and a rigid rearwardly-directed arm 15 is secured to said rock-bar with its rear end loosely and pivotally connected to a loop formed in the upper part of the arch-bar 14. A hand-lever 17 has its lower end fixed on said rock-bar and has a movable detent of the usual kind adapted to releasably engage teeth on an adjacent fixed rack-segment 25. By said means the plows may be simultaneously raised or lowered to an adjusted distance.

The numerals 8 and 24 respectively denote depending slide-ways fixed to the frame 1 on its opposite sides, being each a vertically slotted body adapted to slidably receive an adjacent end of the tiltable bar 6 therethrough for restricted vertical motion slidably therein.

The numerals 13 and 19 denote respectively hand-levers fulcrumed on opposite sides of the frame 1 and movable past fixed rack-segments 12 and 22, with whose teeth their movable detents may releasably engage. The said hand-levers are in form bell-crank levers, and their lower forwardly-directed arms 10 are at their forward ends pivoted to the upper ends of the linking-bodies 7 and 23 respectively which are at their lower ends pivotally connected to the ends of said tiltable bar 6.

With the last-mentioned independent means, either plow may be independently transversely tilted to be lifted or lowered while rocked, to a height adjusted by the proper engagement of the appropriate hand-lever with its abutting rack-segment, as shown best in Fig. 2. The tilting of each plow is in a direction opposite to the direction of tilting of the other, and without appreciably changing the position of such other plow relative to the tractor or the surface of the ground. The two plows are shown a little to the right-hand of the medial longitudinal line of said tractor 1, in order to be located practically and operatively near the right-hand traction-wheel, and on this account the connections of the plow-beams to the tiltable bar 6 are such as to vary the respective lengths of leverage upon the plows to adjust the positions of the plows suitably for such a relative position. When it is desired to bodily elevate or lower both plows simultaneously, the hand-lever 17 alone is employed for that purpose.

Having described my invention, what I claim as new, and desire to secure by Letters Patent, is:

A tool-hitch for a tractor, comprising a pair of spaced plows, located side by side transversely of a tractor and rigidly connected, said plows having their beams connected to a transversely-tiltable bar, said bar having its ends vertically and slidably mounted in the frame of said tractor, and means for transversely tilting said bar and plows, comprising hand-levers fulcrumed on opposite sides of the tractor-frame, means for holding said levers releasably in adjusted positions, and linking means between the said levers and opposite ends of said tiltable bar, adapted to act with the said hand-levers when either lever is actuated separately to tilt the plows in desired directions transversely.

Signed at Waterloo, Iowa, this 3rd day of April, 1913.

HARRY W. LEAVITT.

Witnesses:
   E. B. PARKHURST,
   G. C. KENNEDY.